United States Patent [19]
Johnson

[11] Patent Number: 5,788,251
[45] Date of Patent: Aug. 4, 1998

[54] TABLE LIFT AND TRANSPORTER

[76] Inventor: Rudolph O. Johnson, 433-59 Sylvan Ave., Mountain View, Calif. 94041

[21] Appl. No.: 562,719

[22] Filed: Nov. 27, 1995

Related U.S. Application Data

[63] Continuation-in-part of Ser. No. 273,894, Jul. 12, 1994, abandoned.

[51] Int. Cl.⁶ ............................................ B62B 3/04
[52] U.S. Cl. ........................... 280/43.17; 280/47.34; 280/79.7; 280/35; 414/495
[58] Field of Search ........................ 280/43.14, 43.17, 280/43.22, 35, 47.12, 47.24, 47.34, 79.7, 79.11; 414/681, 495, 498, 778; 108/157

[56] References Cited

U.S. PATENT DOCUMENTS

| | | | |
|---|---|---|---|
| 2,513,440 | 7/1950 | Alderson | 280/35 |
| 3,458,056 | 7/1969 | Stefan et al. | 414/778 |
| 4,249,749 | 2/1981 | Collier | 280/35 |
| 4,335,990 | 6/1982 | Apter et al. | 280/47.12 |
| 4,655,466 | 4/1987 | Hanaoka | 280/35 |
| 5,018,931 | 5/1991 | Uttley | 414/498 |
| 5,135,350 | 8/1992 | Eelman et al. | 414/498 |
| 5,154,441 | 10/1992 | White et al. | 280/47.24 |
| 5,163,695 | 11/1992 | Pakowsky | 280/79.7 |

FOREIGN PATENT DOCUMENTS 2068305  8/1981  United Kingdom ............... 280/47.24

*Primary Examiner*—Brian L. Johnson
*Assistant Examiner*—Min Yu
*Attorney, Agent, or Firm*—Flehr Hohbach Test Albritton & Herbert LLP

[57] ABSTRACT

A table lift and transporter comprising a frame provided with wheels or casters for easy movement on a floor or pavement, a super structure mounted on the frame for movement between a first position closer to the frame and a second position further from the frame, such super structure having a clamping device for engaging the under structure of a table when the super structure is moved to said second position. The frame has rounded ends facilitating rotating it from a normal horizontal position to a vertical position.

5 Claims, 3 Drawing Sheets

5,788,251

TABLE LIFT AND TRANSPORTER

This application is a continuation-in-part of my abandoned application Ser. No. 08/273,894 entitled TABLE LIFT AND TRANSPORTER filed Jul. 12, 1994.

BACKGROUND OF THE INVENTION

This invention relates to a lift and transporter for tables such as those commonly used in social rooms of establishments such as community rooms of condominiums, mobile home parks, etc.

Such tables are large, typically being about 96 inches long and 31 inches wide and, when not in use, are commonly stacked against a wall along their long edges. When it is desired to remove a table from such a stack, transporting it to the desired location and setting it up, such an operation generally requires the use of two persons of reasonable strength because of the size and weight of the tables.

OBJECTS OF THE INVENTION

It is an object of the invention to provide a means whereby a single person can move such tables from a stack to the place where they are wanted, set them up and then when it is desired to return them from the stack, to move them back to the stack and stack them.

Other objects will be apparent from the ensuing description of the appended claims.

SUMMARY OF THE INVENTION

A table lifter and transporter (hereinafter referred to as "transporter") is provided which comprises a frame equipped with rollers or wheels to facilitate transport from place to place, together with a lifting means mounted on the main frame and locking means for gripping the understructure of the transporter and locking it in place on the transporter and lifting the table, and then for transporting the table to the desired place. Then, by a similar series of operations, to restore it to a stack, the table may be picked up, transported and stacked.

DETAILED DESCRIPTION OF THE PREFERRED EMBODIMENT

Figure 1:
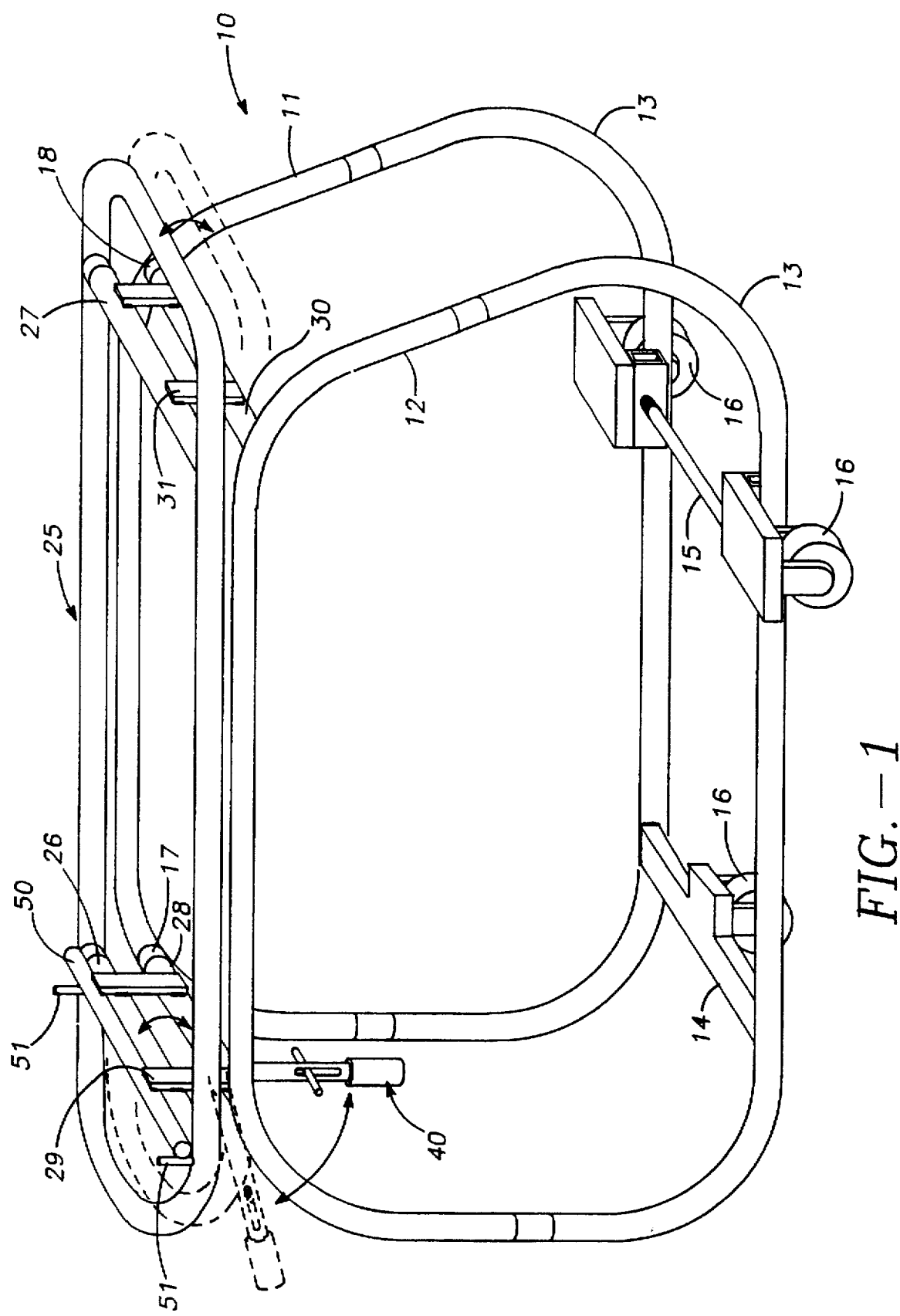
FIG. 1 is a view of the transporter of the invention as a whole.

Referring to FIG. 1, the lift and transporter (hereinafter referred to as transporter) is shown at 10 and it comprises a frame formed by parallel tubes 11 and 12 each of which is shown as being continuous and as having a curved section at 13 for a purpose explained hereinafter.

The tubes 11 and 12 are connected at the bottom by ties 14 and 15 to which are attached casters 16 by means of which the transporter can be moved readily. The tubes 11 and 12 are tied together at the top by cross members 17 and 18.

As will be seen, the cross members 17 and 18 are connected to the tubes 11 and 12 below the horizontal upper sections of these tubes for clearance purposes, as will be apparent from the description below.

A super structure 25 is provided which is tubular and continuous and which has cross members 26 and 27. The cross member 26 is mounted on a sleeve 28 by means of brackets 29, and the cross member 27 is mounted on a sleeve 30 by means of brackets 31. The sleeves 28 and 30 are rotatable on the cross members 17 and 18, respectively, such that the super structure 25 can be moved between an upper position, shown in solid lines in FIG. 1, and a lower position, shown in broken lines. In the lower position the tubular super structure 25 is level with the tops of the tubes 11 and 12 such being permitted by the above-mentioned positioning of the cross members 17 and 18 below the upper sections of the tubings 11 and 12.

Figure 2:
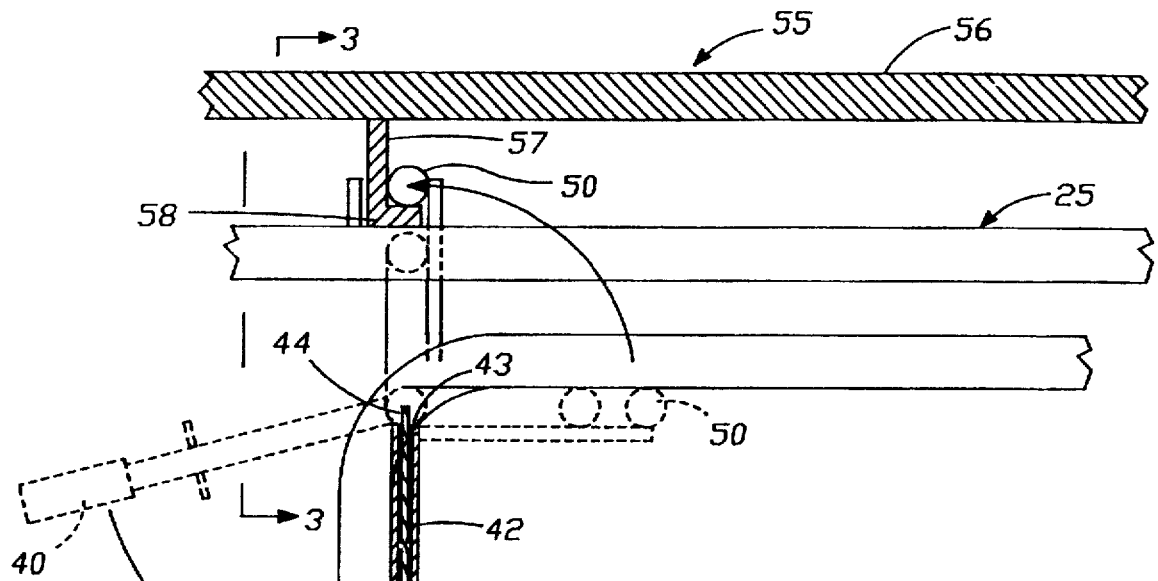
FIG. 2 is a fragmentary view showing how the transporter is locked to the under structure of the table.
Figure 3:
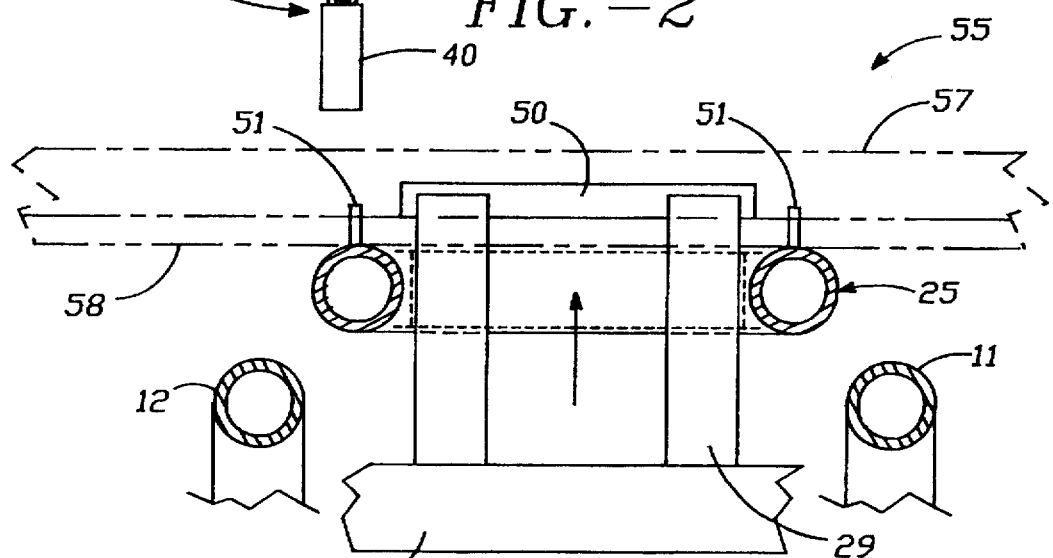
FIG. 3 is a cross section along the line 3—3 of FIG. 2.
Figure 4:
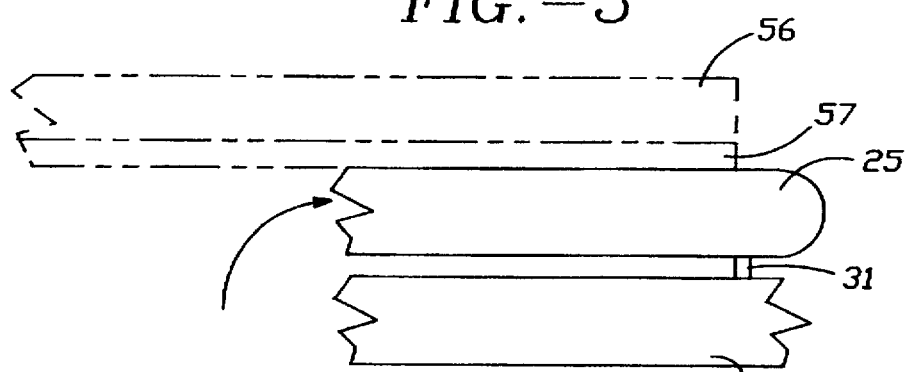
FIG. 4 is a fragmentary view showing the transporter clamped to a table.

The sleeve 28 is connected to a handle 40 which, as shown in FIG. 2, is hollow and contains a spring 41 equipped with a handle 42. The spring 41 carries a rod 43 at its upper end (as viewed in FIG. 2). As the handle 40 is rotated from the position shown in broken lines in FIG. 1 to the position shown in full lines, the sleeve 28 rotates on the cross piece 17 until the rod 43 registers with a hole 44 in the cross piece 17, at which time the spring 41 thrusts the rod 43 into the hole 44 and locks the super structure 25 in the elevated position shown in full lines in FIG. 1.

The brackets 29 are fixed at their upper ends to a rod 50. Opposing this rod and spaced therefrom are fingers 51 fixed to the super structure 25.

Figure 5:
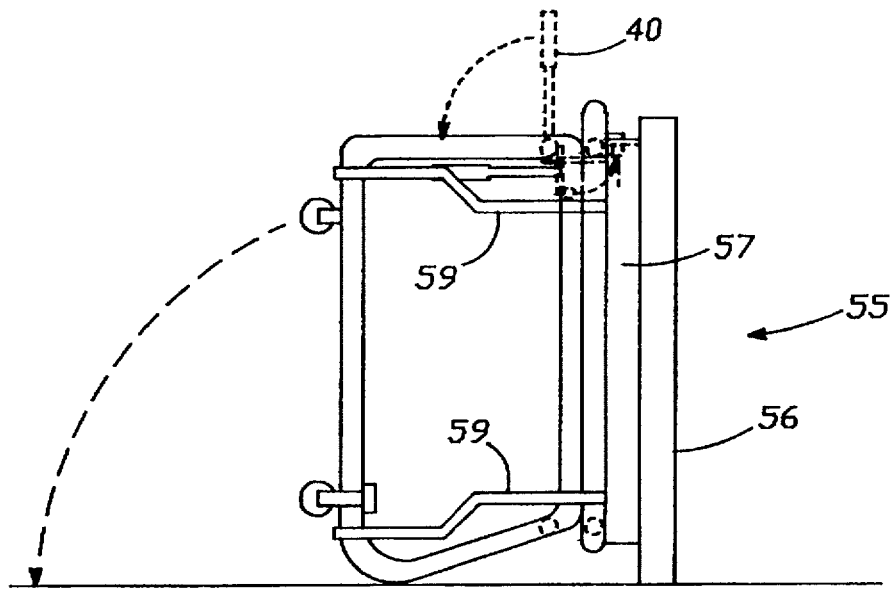
FIG. 5 is a view showing how the transporter approaches and grips a stacked table, lifts it and then moves the table to horizontal position for transport.
Figure 6:
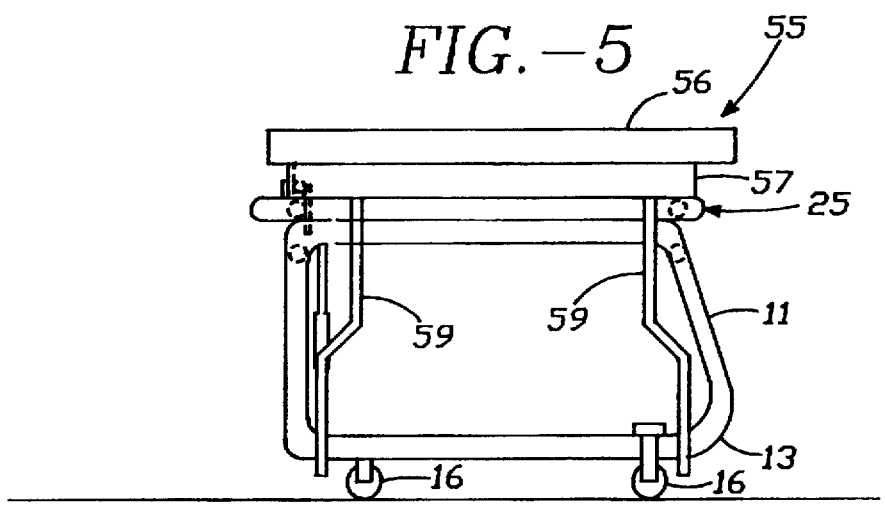
FIG. 6 is a view showing a table gripped by the transporter, lifted with its legs off the floor and moved to the desired place.
Figure 7:
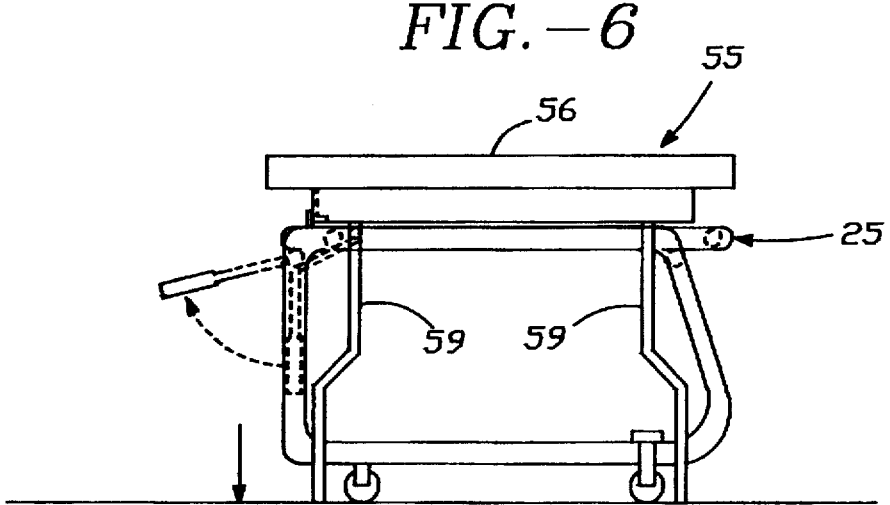
FIG. 7 is a view similar to that of FIG. 6 but with the table lowered so that it stands on its legs on the floor and the transporter can be removed.

Referring now to FIGS. 5, 6 and 7 and also to FIG. 2, the transporter is shown in FIG. 5 wheeled up to a table 55 which may be leaning against a wall or other support (not shown). The transporter 10 is tilted on its grounded corners 13 to the position shown. The table 55 has a flat top 56 and a flange 57 projecting beneath it. As shown in FIG. 2 this flange is L-shaped, having an inwardly extending portion 58. Meanwhile, the handle 40 is in the position shown in broken lines in FIG. 1. Then the handle 40 is moved to the position shown in solid lines in FIGS. 1 and 2. This lifts the super structure 25 so that the rod 50 and the pins 51 straddle the flange 57 and assume the position shown in FIG. 2. The spring 42 inserts the rod 43 into the hole 44 in cross member 17, thus locking the super structure to the flange of the table. Also this action lifts the table slightly from the floor.

Then, as shown by the broken line to the left of FIG. 5, the transporter is rotated to the position shown in FIG. 6, the legs 59 of the table having been folded out to their normal position for supporting the table.

When the table has been transported to the desired position the handle 40 is lifted to the position shown in FIG. 7. This sets the table down on the floor and releases it from the gripping members 29 and 51.

The transporter is then removed and wheeled to pick up another table from the storage area.

When it is desired to lift a table which has been thus positioned and set up, and to transport it back to a storage area, the same sequence of operations are carried out, except that the lift is wheeled underneath the table, the handle is moved down, the table is clamped and lifted and is then wheeled to the storage area. Then the transporter is tilted to the position shown in FIG. 5 and the handle 40 is pulled up to release the rod 43 from the cross piece 17 and the table is tilted back to the desired position, resting against, for example, a wall.

It will therefore be apparent that a new and useful lift and transporter has been provided.

What is claimed:

1. A lift and transporter assembly for use with an article having opposed major surfaces, a peripheral edge joining the major surfaces, and an engageable structure formed on one of the major surfaces, said lift and transporter assembly comprising a frame provided with a support which permits easy movement of said frame on a surface, said frame having a top, a super structure supported at the top of the frame for movement between a first position closer to the frame and a second position farther from the frame, and a clamp assembly carried by said super structure and adapted to clamp the engageable structure formed on one of the major surfaces of the article to secure the article to said frame when said super structure is moved to the second position and to release the engageable structure on the article when said super structure is moved to the first position, said super structure including a pair of pins mounted to said super structure and adapted to engage one side of the engageable structure on the article and said clamp assembly including a movable clamping member adapted to engage the opposite side of the engageable structure when said super structure is moved to the second position relative to said frame.

2. The lift and transport assembly of claim 1 wherein said frame is mounted on wheels for ready movement on a surface, such frame having a forward end and a rearward end, said forward end having a curvature which facilitates rotating the frame between a first horizontal position and a second vertical position.

3. The lift and transport assembly of claim 2 wherein the frame comprises two spaced parallel frame members coupled together by connecting members, said super structure being rotatably mounted on said connecting members in such manner that the super structure is movable between a first position closer to the frame and a second position farther from the frame.

4. The lift and transport assembly of claim 1 wherein the frame comprises two spaced parallel frame members coupled together by connecting members and mounted on wheels for easy transport along a surface, said super structure being rotatably mounted on said connecting members in such manner that the super structure is movable between a first position closer to the frame and a second position farther from the frame.

5. In combination, a lift and transporter assembly and an article, said article having opposed major surfaces, a peripheral edge joining said major surfaces, and an engageable structure formed on one of said major surfaces, said lift and transporter assembly comprising a frame provided with a support which permits easy movement of said frame on a surface, said frame having a top, a super structure supported at the top of the frame for movement between a first position closer to the frame and a second position farther from the frame, and a clamp assembly carried by said super structure and adapted to clamp said engageable structure formed on one of said major surfaces of said article when said super structure is moved to the second position to secure said article to said frame and to release said engageable structure on said article when said super structure is moved to the first position, said super structure including a pair of pins mounted to said super structure, said pins engaging one side of said engageable structure and said clamp assembly including a movable clamping member engaging the opposite side of said engageable structure when said super structure is moved to the second position relative to said frame.

* * * * *